US011623299B2

(12) United States Patent
Sauer (10) Patent No.: US 11,623,299 B2
(45) Date of Patent: Apr. 11, 2023

(54) DEVICE FOR DETERMINING AN ORIENTATION OF AN OPTICAL DEVICE OF A COHERENCE TOMOGRAPH, COHERENCE TOMOGRAPH AND LASER PROCESSING SYSTEM (71) Applicant: Precitec GmbH & Co. KG, Gaggenau (DE)

(72) Inventor: Matthias Sauer, Karlsruhe (DE)

(73) Assignee: PRECITEC GMBH & CO. KG, Gaggenau (DE)

( * ) Notice: Subject to any disclaimer, the term of this patent is extended or adjusted under 35 U.S.C. 154(b) by 457 days.

(21) Appl. No.: 16/634,730

(22) PCT Filed: Feb. 25, 2019

(86) PCT No.: PCT/EP2019/054528
§ 371 (c)(1),
(2) Date: Jan. 28, 2020

(87) PCT Pub. No.: WO2019/174895
PCT Pub. Date: Sep. 19, 2019

(65) Prior Publication Data
US 2020/0198051 A1  Jun. 25, 2020

(30) Foreign Application Priority Data
Mar. 14, 2018 (DE) ............. 10 2018 105 877.2

(51) Int. Cl.
*B23K 26/042* (2014.01)
*B23K 26/06* (2014.01)
(Continued)

(52) U.S. Cl.
CPC .......... *B23K 26/042* (2015.10); *B23K 26/032* (2013.01); *B23K 26/0643* (2013.01);
(Continued)

(58) Field of Classification Search
CPC .................. B23K 26/042; B23K 26/032; B23K 26/0643; B23K 26/14; G01B 9/02091; G02B 5/09
See application file for complete search history.

(56) References Cited

U.S. PATENT DOCUMENTS 4,504,147 A * 3/1985 Huang .................... G01B 11/26
356/520
5,465,147 A * 11/1995 Swanson ............ G01B 9/02019
356/497
(Continued)

FOREIGN PATENT DOCUMENTS

CN           103476537 A      12/2013
CN           105246636 A       1/2016
(Continued)

OTHER PUBLICATIONS

International Search Report dated Jul. 24, 2019, International Application No. PCT/EP2019/054528.

*Primary Examiner* — John J Norton
*Assistant Examiner* — Franklin Jefferson Wang
(74) *Attorney, Agent, or Firm* — Dinsmore & Shohl LLP (57) ABSTRACT A device is provided for determining an orientation of an optical device of a coherence tomograph. The device has an optical reference geometry, a deflection optics configured to direct an optical measuring beam reflected by the optical device onto the optical reference geometry, and an evaluation unit configured to determine a distance between a first reference plane and at least one second reference plane of the optical reference geometry in order to determine the orientation of the optical device.

12 Claims, 5 Drawing Sheets (51) Int. Cl.
*B23K 26/03* (2006.01)
*B23K 26/14* (2014.01)
*G01B 9/02* (2022.01)
*G01B 9/02091* (2022.01)
*G01B 9/02055* (2022.01)
*G02B 5/09* (2006.01)

(52) U.S. Cl.
CPC .......... *B23K 26/14* (2013.01); *G01B 9/02072* (2013.04); *G01B 9/02091* (2013.01); *G02B 5/09* (2013.01)

(56) References Cited

U.S. PATENT DOCUMENTS

| | | | |
|---|---|---|---|
| 2008/0049211 A1* | 2/2008 | Ueshima | G01B 9/02049 356/4.09 |
| 2008/0100848 A1* | 5/2008 | Kobayashi | G01B 9/02009 356/497 |
| 2014/0327918 A1* | 11/2014 | Sugiyama | G01B 9/02074 356/479 |
| 2016/0039045 A1* | 2/2016 | Webster | B23K 26/244 356/450 |
| 2016/0202045 A1* | 7/2016 | Schönleber | B23K 26/03 356/497 |
| 2018/0299251 A1* | 10/2018 | Liba | G02B 27/48 |

FOREIGN PATENT DOCUMENTS

| | | |
|---|---|---|
| CN | 107076546 A | 8/2017 |
| CN | 107771112 A | 3/2018 |
| DE | 102015012565 B3 | 10/2016 |
| DE | 102016204140 B3 | 4/2017 |
| EP | 1892500 A2 | 2/2008 |
| JP | 3088117 B2 | 9/2000 |
| JP | 2011508241 A | 3/2011 |
| JP | 2016538134 A | 12/2016 |
| WO | 2014138939 A1 | 9/2014 |
| WO | 2017081808 A1 | 5/2017 |
| WO | 2017/207261 A1 | 12/2017 |

* cited by examiner

DEVICE FOR DETERMINING AN ORIENTATION OF AN OPTICAL DEVICE OF A COHERENCE TOMOGRAPH, COHERENCE TOMOGRAPH AND LASER PROCESSING SYSTEM

CROSS-REFERENCE TO RELATED APPLICATIONS

This application is the U.S. national stage of PCT/EP2019/054528 filed Feb. 25, 2019, which claims priority of German Patent Application 102018105877.2 filed Mar. 14, 2018 both of which are hereby incorporated by reference in their entirety.

FIELD OF INVENTION

The present disclosure relates to a device for determining a position or orientation of an optical device of a coherence tomograph, a coherence tomograph including the same, and a laser machining system including such a coherence tomograph. The present disclosure particularly relates to a laser machining head, e.g., a laser welding head comprising an optical coherence tomograph and a device for determining a drift of one or more optical devices of the coherence tomograph, such as a mirror, prism. or optical grating.

BACKGROUND OF THE INVENTION

In a device for machining material using a laser, e.g., in a laser machining head for laser welding or laser cutting, the laser beam emitted from a laser light source or an end of a laser fiber is focused or collimated onto the workpiece to be machined by means of a beam guiding and focusing optics. Typically, a laser machining head is used with a collimator optics and a focusing optics, wherein the laser light is supplied via an optical fiber, also referred to as laser source.

In laser material machining, optical coherence tomography (OCT) may be used to measure various process parameters, such as the distance to the workpiece during laser cutting, the edge position in advance, and the weld depth during a weld and/or the surface topography in the follow-up. For this purpose, an OCT measuring beam may be directed onto the workpiece. Optionally, the OCT measuring beam may be moved over the workpiece to be machined, for example by means of reflection on at least one movable mirror. The movable mirror is, for example, attached to a galvanometer and thus forms a galvanoscanner or a galvanometer scanner. Since the OCT measurements are used to monitor and control the machining process, the angular position of the galvanometer scanner and thus the position of the measurement spot on the workpiece must be known as accurately as possible for each recorded measurement. The monitoring of welding processes by means of OCT is known, for example, from WO 2014/138939 A1.

Galvanometer scanners may include a position detector measuring the actual position of the axis of rotation of the scanner. The position may be compared with a predetermined desired position by a control loop and the deviation may be minimized. Theoretically, therefore, in the stationary state, the deviation between the position specified from outside and the position reached by the scanner should be zero. In real operation, however, thermal effects, external interference, and deterioration of the used position detectors of the galvanometer scanner result in a deviation of the real angular position from the desired position. The control loop cannot correct this deviation because, e.g., the position detector, the value of which is used for control, is itself subject to thermal influences and the control loop thus cannot detect a small deviation of the actual position from the desired position. This phenomenon is also called the drift of a galvoscanner and is both time- and temperature-dependent. Therefore, the true position of the measurement spot on the workpiece surface cannot be determined with sufficient accuracy at all times because the measurement spot position changes with the drift of the scanner even if the target position of the mirror is kept constant.

It is therefore desirable to determine the drift of a galvanometer scanner more accurately than is possible, for example, with the position detector installed in the galvanometer scanner in order to minimize the deviation between the desired and actual positions. DE 10 2015 012 565 B3 describes a measuring device including a spatially resolving sensor configured to detect a region of the workpiece measured by a measuring beam by means of a sensor beam and to generate spatially resolving information based thereon. In addition, this spatially resolving sensor must be introduced into the system, thereby increasing the manufacturing costs and the complexity of the system.

SUMMARY OF THE INVENTION

It is an object of the present disclosure to provide a device for determining a drift or orientation of an optical device of a coherence tomograph, as well as a coherence tomograph and a laser machining system including the same, which can accurately determine an orientation of an optical device. In particular, it is an object of the present disclosure to determine a difference between a desired position and an actual position of an optical device for displacing a measuring beam of the coherence tomograph, such as a movable mirror, prism or optical grating, with increased accuracy.

This object is achieved by the subject matter disclosed herein. Advantageous embodiments of the invention are also disclosed.

According to embodiments of the present disclosure, a device for determining an orientation or a drift of an optical device or an optical element of a coherence tomograph is specified. The optical device or the optical element may be configured to deflect an optical measuring beam of the coherence tomograph. In particular, the optical device or the optical element may be movable. The device comprises an optical reference geometry, a deflection optics configured to direct an optical measuring beam of the coherence tomograph displaced or reflected by the optical device onto the optical reference geometry, and an evaluation unit configured to determine a distance between a first reference plane and at least one second reference plane of the optical reference geometry to determine the orientation or drift of the optical device. Drift may denote a deviation of an orientation of the optical device from a predetermined orientation. The optical device or the optical element of the coherence tomograph may be movable. In particular, the optical device or the optical element may be configured to displace an optical measuring beam of the coherence tomograph or to move it on a workpiece surface. The second reference plane is preferably suitable for reflecting or diffusely reflecting the optical measuring beam.

In accordance with the invention, the existing OCT measurement technique may be used, for example, to measure the difference between the desired and actual positions of the optical device, e.g., one or more mirrors of a galvanometer scanner. The use of an additional spatially resolving detector for determining the orientation or the drift of the optical device can be omitted. For determining the orientation of the optical device and, in particular, the drift of the galvanometer scanner, the measuring beam is directed towards the reference geometry and the distance is measured. From the measured distance or change of the measured distance with respect to a reference or calibration value, the orientation of the optical device may be determined and preferably subsequently corrected.

Preferred optional embodiments and particular aspects of the disclosure will be apparent from, the drawings, and the present description.

Preferably, the evaluation unit may be configured to determine a deviation of the orientation of the optical device from a predetermined orientation, that is, for example, a difference between the desired and actual positions of the optical device.

Preferably, the deflection optics comprises one or more mirrors. For example, the measuring beam may be directed to the reference geometry by the one or more mirrors. Optionally, the deflection optics includes a lens configured to focus the optical measuring beam onto the reference optical geometry. By focusing the beam size, distance changes may be determined with increased accuracy.

Preferably, the deflection optics may comprise at least one partially transmissive mirror configured to deflect a portion of the optical measuring beam. For example, the measuring beam may be divided by the partially transmissive mirror, whereby a distance measurement with respect to a work plane and the reference geometry may be performed at the same time.

Preferably, the evaluation unit is configured to determine a positioning of the optical device. For example, an angular position of one or more mirrors, e.g. an angular position of a galvanometer scanner, may be determined. For example, the angular position may be corrected based on a difference between a desired position and an actual position to compensate for drift. For this purpose, the evaluation unit may be configured to output a correction value for the drift correction, e.g. to a control unit for aligning the optical device.

Preferably, the evaluation unit is configured to determine a distance between the first reference plane and one, two or more points on the optical reference geometry. By measuring a plurality of points on the reference geometry, an accuracy of the determination of the orientation of the optical device may be increased.

Preferably, the optical reference geometry has at least one planar diffusely reflective surface. Typically, the reference geometry is an optical element with a surface having discontinuities. In particular, the reference geometry may have multiple non-parallel planes. Each of the non-parallel planes may provide a respective second reference plane. For example, the optical reference geometry may comprise two or more second reference planes, wherein the two or more second reference planes are each planar diffusely reflective surfaces. The two or more second reference planes may comprise four second reference planes. The four second reference planes may be inclined towards each other and meet at a common point. In other words, four second reference planes may intersect at a common point or a calibration zero point. The reference geometry may have a saddle-like shape of at least four second reference planes. Furthermore, the reference geometry may include a calibration plane and/or a calibration zero point.

Preferably, at least two of the second reference planes are arranged such that, a deviation of the orientation of the optical device in a first direction results in an increase in distance with respect to a calibration position or calibration plane on the reference geometry. The at least two of the second reference planes may be oppositely inclined planes. At least two further second reference planes may be arranged such that a deviation in the orientation of the optical device in a second direction results in a decrease in distance with respect to a calibration position or calibration plane on the reference geometry. The at least two further of the second reference planes may be opposite inclined planes. The first and second directions may designate a positive and a negative direction along the same coordinate axis (e.g., X axis or Y axis). Alternatively, the first direction may designate a direction along a first coordinate axis and the second direction a direction along a second coordinate axis perpendicular to the first coordinate axis.

In accordance with further embodiments of the present disclosure, a coherence tomograph is provided. The coherence tomograph comprises an optical device and the device for determining an orientation of the optical device according to the above-described embodiments.

The optical device may be configured to displace an optical measuring beam of the coherence tomograph or to move it on a workpiece surface. Preferably, the optical device comprises at least one element selected from at least one mirror, at least one optical grating and at least one prism. The optical device may be or comprise a galvanometer scanner. The optical device, e.g. the at least one mirror, may be mounted rotatably about one or more axes, such as an X axis and a Y axis, oriented perpendicularly to each other. Typically, two mirrors are provided, one of which is mounted rotatably about the X axis and the other about the Y axis.

Preferably, the optical coherence tomograph is configured to detect a deviation in orientation, i.e., a drift, of the optical device based on the determined distance in one or more spatial dimensions. For example, the angular position of the at least one mirror of the galvanometer scanner may be corrected by rotating about the axes in two spatial dimensions. The two spatial dimensions may be, for example, the X and Y directions.

Preferably, the coherence tomograph comprises a reference arm. The device for determining an orientation of the optical device may be provided additionally to and separately from the reference arm. For example, the optical device may comprise a galvanometer scanner in the reference arm of the coherence tomograph.

According to other embodiments, a laser machining system is provided. The laser machining system comprises a laser device for providing a machining beam, the laser device being configured to direct the machining beam to a machining area of a workpiece, and the coherence tomograph according to the above-described embodiments.

According to further embodiments, a method for determining an orientation of an optical device of a coherence tomograph is provided. The method comprises directing an optical measuring beam to an optical reference geometry, determining a distance between a first reference plane and at least a second reference plane of the reference optical geometry, and determining the orientation of the optical device based on the measured distance.

According to the present invention, inexpensive galvoscanners may be used for high-precision applications. No additional detectors or light sources are needed, resulting in a simpler, more robust design and achieving cost reduction. In some embodiments, even additional beam splitters may be omitted.

BRIEF DESCRIPTION OF THE DRAWINGS

Embodiments of the disclosure are illustrated in the figures and will be described in more detail below. In the figures.

DETAILED DESCRIPTION OF THE INVENTION

In the following, unless otherwise noted, like reference numerals will be used for like and equivalent elements.

Figure 1:
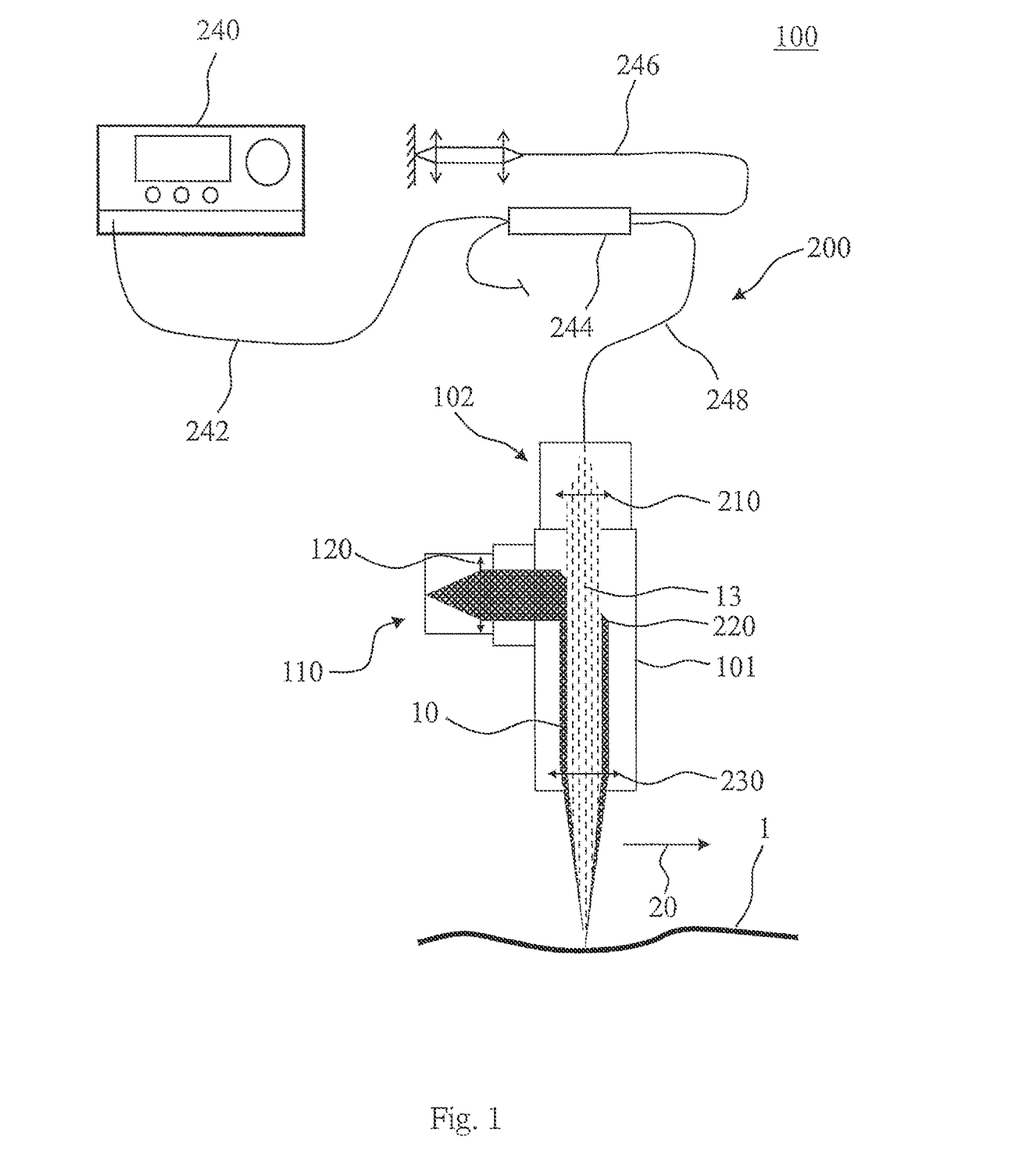
FIG. 1 shows a laser machining system according to embodiments of the present disclosure.

FIG. 1 shows a schematic diagram of a laser machining system 100 according to embodiments of the present disclosure. The laser machining system 100 may comprise a laser welding head 101, and in particular a laser welding head for laser deep welding.

The laser machining system 100 comprises a laser device 110 for generating a machining beam 10 (also referred to as "laser beam" or "machining laser beam") and a coherence tomograph 200 according to the embodiments described herein. The laser machining system 100, and in particular the coherence tomograph 200, comprises the device for determining an orientation of an optical device of the coherence tomograph 200. The device is described in more detail with reference to FIGS. 2 to 8.

The laser device 110 is configured to direct the machining beam 10 onto a machining area of a workpiece 1. The laser device 110 may include a collimator lens 120 for collimating the machining beam 10. Within the laser welding head 101, the machining beam 10 is deflected by a suitable optics 220 by approximately 90° in the direction of the workpiece 1. The coherence tomograph 200 typically comprises a collimator optics 210 configured to collimate the optical measuring beam 13 and a focusing optics 230 configured to focus the optical measuring beam 13 onto the workpiece 1.

In some embodiments, the machining beam 10 and the optical measuring beam 13 may be at least partially coaxial, and in particular may be coaxially superimposed at least in segments. For example, the coherence tomograph 200 may be configured to couple the optical measuring beam 13 into a beam path of the laser device 110. The optical measuring beam 13 and the machining beam 10 may be merged downstream of the collimator optics 210 and upstream of the focusing optics 230. For example, the optics 220 may comprise a semitransparent mirror.

In typical embodiments that may be combined with other embodiments described herein, the collimator optics 210 and the focusing optics 230 are integrated into the weld head 101. For example, the weld head 101 may comprise a collimator module 102 integrated into the weld head 101 or mounted to the weld head 101. The focusing optics 230 may be a common focusing optics, such as a focus lens, for the machining beam 10 and the measuring beam 13.

According to embodiments, the laser machining system 100 or parts thereof, such as the welding head 101, may be movable along a machining direction 20. The machining direction 20 may be a cutting or welding direction and/or a moving direction of the laser machining system 100, such as the welding head 101, with respect to the workpiece 1. In particular, the machining direction 20 may be a horizontal direction. The machining direction 20 may also be referred to as "feed direction".

In typical embodiments, the principle of distance measurement described herein is based on the principle of optical coherence tomography, which makes use of the coherence properties of light bay means of an interferometer. The coherence tomograph 200 may comprise an evaluation unit 240 with a broadband light source (for example, a superluminescent diode, SLD) which couples the measurement light into an optical wave-guide 242. In a beam splitter 244, preferably including a fiber coupler, the measuring light is split into a reference arm 246 and a measuring arm leading into the welding head 101 via an optical waveguide 248.

The collimator optics 210 is configured to collimate the measuring light (optical measuring beam 13) exiting from the optical waveguide 248. According to some embodiments, the optical measuring beam 13 in the welding head 101 may be superimposed coaxially with the machining beam 10. Subsequently, the machining laser beam 10 and the optical measuring beam 13 may be focused onto the workpiece 1 by the focusing optics 230, which may be a common lens or focusing lens.

A position of the optical measuring beam 13 on the workpiece 1 may be adjusted by an optical device. For example, the optical device may be a galvanoscanner. The optical device may comprise at least one mirror (see, e.g., FIGS. 2 and 3). Alternatively or additionally, the optical device may also comprise at least one optical grating or at least one prism. The optical device, such as the at least one mirror, may be mounted rotatably about at least one axis, such as an X axis and/or a Y axis. Typically, the optical device comprises two mirrors, one mirror being mounted rotatably about the X axis and the other mirror rotatably about the Y axis. The optical coherence tomograph 200 may be further configured to correct, based on the determined distance, an angular position of the at least one mirror, prism, or grating of the galvanometer scanner in one or more spatial dimensions in order to compensate for drift. Here, the optical device may also be arranged in the reference arm of the coherence tomograph.

The optical measuring beam 13 may be directed, for example, into a vapor capillary on the workpiece 1. The measuring light reflected back from the vapor capillary is imaged onto the exit/entry surface of the optical waveguide 248 by the focusing optics 230, superimposed with the reflected light from the reference arm 246 in the fiber coupler 244 and then directed back into the evaluation unit 240. The superimposed light contains information about the path length difference between the reference arm 246 and the measuring arm. This information is evaluated in the evaluation unit 240, whereby the user gets information about the distance between the bottom of the vapor capillary and, for example, the welding head 101 or about a topography of the workpiece surface. The device for determining an orientation of the optical device may be provided additionally to and separately from the reference arm.

According to embodiments, the coherence tomograph 200 may be configured to measure, by means of the optical measuring beam 13, a distance to the workpiece 1, for example with respect to a reference point defined by the coherence tomograph 200 or a reference plane. In particular, the coherence tomograph 200 may be configured to measure a change in distance as the welding head 101 moves along the machining direction 20. As a result, for example, a depth profile of the vapor capillary may be created. Alternatively or additionally to the measurement of the depth of the vapor capillary, a topography measurement of the workpiece 1, for example the weld seam, may be performed. According to embodiments, the topography measurement may be used for error detection and/or control of one or more process input variables. The process input variables may include, for example, a machining speed, a laser power, a laser focus, and/or operating parameters of the laser device.

The coherence tomograph 200 according to the invention may be configured to perform distance measurements, for example, before, during and/or after the laser machining. As already explained, the optical measuring beam 13, which may be a low-energy measuring beam, is fed to the machining head via an optical waveguide, collimated and then coaxially superimposed with the high-energy machining beam and focused onto the workpiece to be machined by a common focus optics. The determination of the orientation of the optical device of the coherence tomograph 200 and a subsequent correction of the orientation allows a distance measurement to the workpiece with increased accuracy. The determination of the orientation of the optical device may be performed during the laser machining or separately in a separate process.

Figure 2:
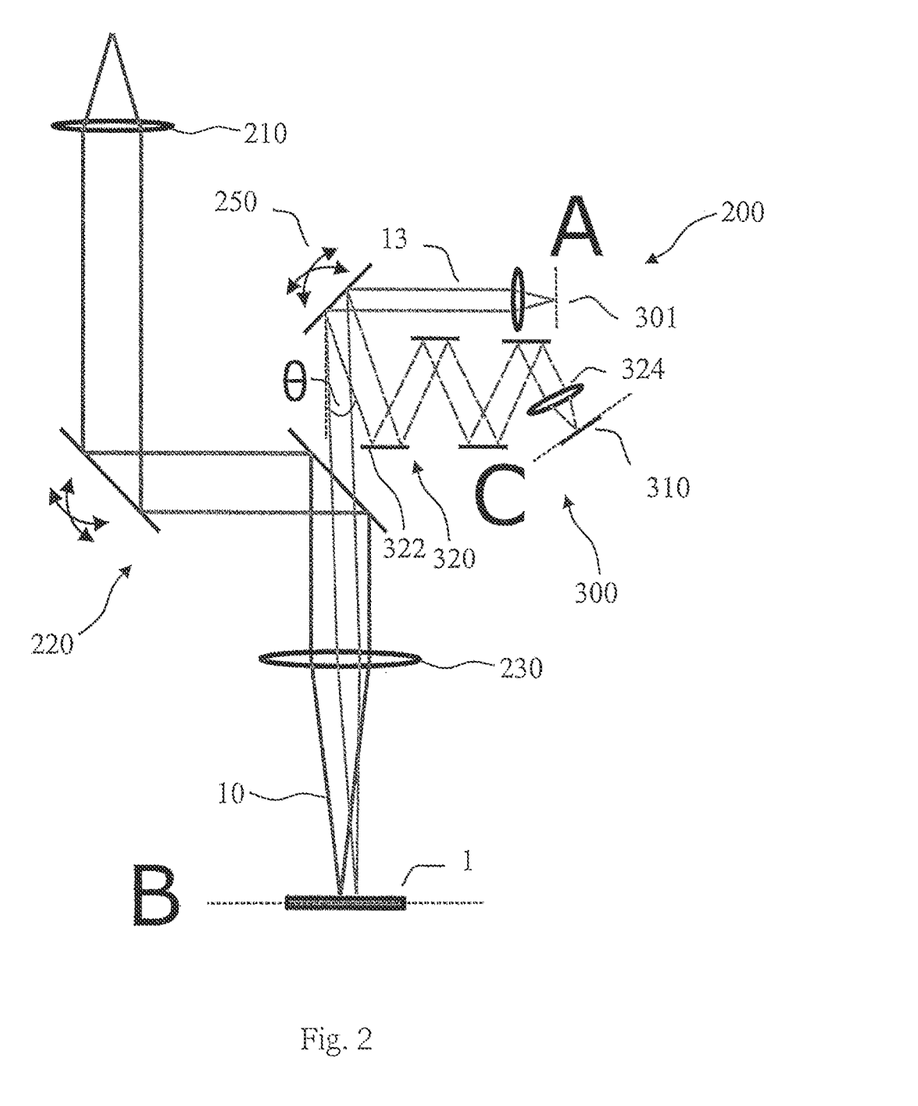
FIG. 2 shows a laser machining system including a device for determining an orientation of an optical device of a coherence tomograph according to an embodiment of the present disclosure.

FIG. 2 shows a laser machining system including a device 300 for determining an orientation of an optical device 250 of a coherence tomograph according to embodiments of the present disclosure. In particular, the displacement of the measuring beam 13 (also referred to as "OCT beam") for determining the drift of a galvanometer scanner is shown.

The device 300 comprises an optical reference geometry 310, a deflection optics 320 configured to direct an optical measuring beam 13 reflected by the optical device 250 onto the optical reference geometry 310, and an evaluation unit configured to determine a distance between a first reference plane A and the optical reference geometry 310 or one or more second reference planes C of the optical reference geometry 310 in order to determine the orientation of the optical device 250. The evaluation unit may be the evaluation unit which is shown in FIG. 1 and provided with the reference numeral 240 or may be integrated therein.

In the exemplary embodiment described in FIG. 2, an OCT light source 301 is directed via the optical device 250, which may comprise at least one movable mirror, either onto the workpiece 1 in order to be able to take a measurement of the workpiece 1 (i.e., to measure the distance between the planes A and B) or onto the deflection optics 320 in order to measure the distance between the planes A and C. Thus, in accordance with the present disclosure, the existing OCT measurement technique may be used to determine the difference between desired and actual positions of the optical device 250. The use of an additional spatially resolving detector is thus omitted. This allows inexpensive galvoscanners to be used for high-precision applications. No additional detectors, light sources or beam splitters are needed, which allows for a simpler and more robust design and cost reduction.

For determining the drift, the measuring beam 13 is directed onto the reference geometry 310. For this purpose, the measuring beam 13 may, for example, be guided onto the reference geometry 310 by the displacement of the optical device 250. In some embodiments, the deflection optics 320 includes one or more mirrors 322. For example, the measuring beam 13 may be reflected by multiple mirrors 322 multiple times in order to direct it onto the reference geometry 310. Optionally, the deflection optics 320 includes a lens 324 configured to focus the optical measuring beam 13 onto the reference optical geometry 310. By focusing the beam size, distance changes can be determined with increased accuracy. The drift may be determined periodically during material machining (and may preferably be corrected subsequently).

In some embodiments, the evaluation unit is configured to determine a positioning of the optical device 250. For example, an angular position of one or more mirrors, one or more galvanometer scanners, one or more prisms, or one or more optical gratings or combinations thereof may be determined. For example, the angular position may be corrected based on a difference between the desired and actual positions to compensate for drift caused by thermal effects, external interference, and/or degradation of the position detectors used. For this purpose, the evaluation unit 240 may transmit a correction value for correcting the orientation to the coherence tomograph.

According to some embodiments, the optical coherence tomograph 200 is configured to correct for a deviation of the orientation of the optical device 250 based on the distance determined in one or more, and in particular in two, space dimensions. The two spatial dimensions may, for example, be the X and Y directions (see FIGS. 6 to 8). For example, the optical coherence tomograph 200 is configured to correct, based on the determined distance between the planes A and C, an angular position of the at least one mirror of a galvanometer scanner in the respective spatial dimensions.

The first reference plane A may be a reference plane in the measuring arm of the coherence tomograph for the measurements of the distance to the workpiece 1 and may additionally be used for determining the orientation of the optical device 250. In other words and as previously mentioned, the existing OCT measurement technique may be used to determine the difference between the desired and actual positions of the optical device 250 by directing the measuring beam 13 onto the reference geometry 310 by means of the optical device 250. Typically, the first reference plane A is the plane of the light source 301 of the coherence tomograph.

The optical reference geometry 310 provides one or more second reference planes C. The distance determined by the device according to the invention is defined between the first reference plane A and a corresponding second reference plane C. Preferably, a distance between the first reference plane A, such as the plane of the light source 301, and the plane of the workpiece 1 (i.e., the work plane B) corresponds to the distance between the first reference plane A and at least one second reference plane C or calibration position of the reference optical geometry 310. This is because an OCT measuring system usually offers only a small measuring range, e.g., in the range of about 12 mm. Therefore, if the distances differ by more than the size of the measuring range, only one of the two distances can be measured. Alternatively, the reference arm length may be readjusted, but this entails increased effort and costs. The distance between the planes A and C, and in particular between the plane A and the calibration position, is designated $l_0$, and may be precisely determined for at least one angle $\theta_0$, e.g. when setting up the system, by means of OCT measurement technology.

Figure 3:
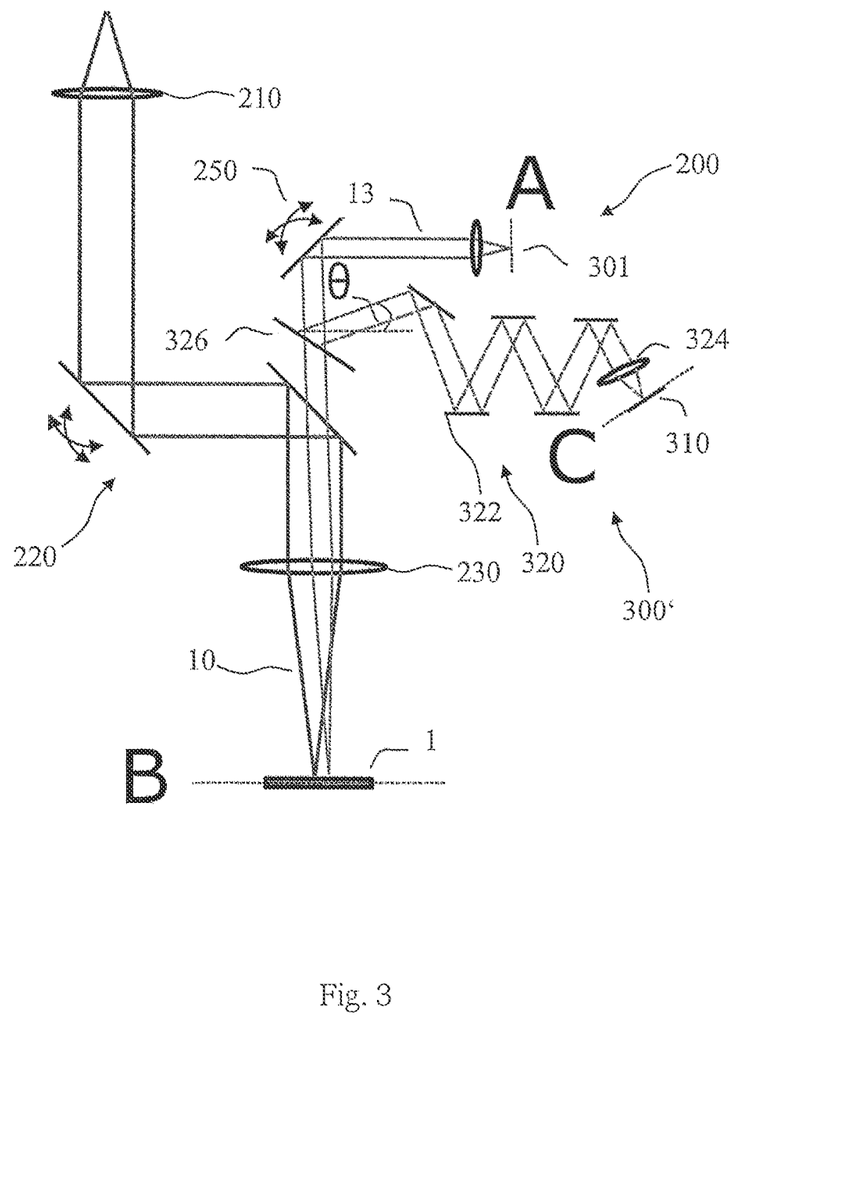
FIG. 3 shows a laser machining system including a device for determining an orientation of an optical device of a coherence tomograph according to further embodiments of the present disclosure.

FIG. 3 shows a laser machining system including a device 300' for determining an orientation of an optical device 250 of a coherence tomograph according to further embodiments of the present disclosure. The laser machining system of FIG. 3 is similar to the laser machining system shown in FIG. 2 and a description of similar and identical features will not be repeated.

In the example of FIG. 3, the deflection optics 320 comprises at least one beam splitter or a partially transmissive mirror 326 configured to deflect a portion of the optical measuring beam 13. For example, the measuring beam 13 may be divided by the partially transparent mirror 326, allowing a distance measurement to the work plane B and the reference geometry 310 to be performed at the same time.

Figure 4:
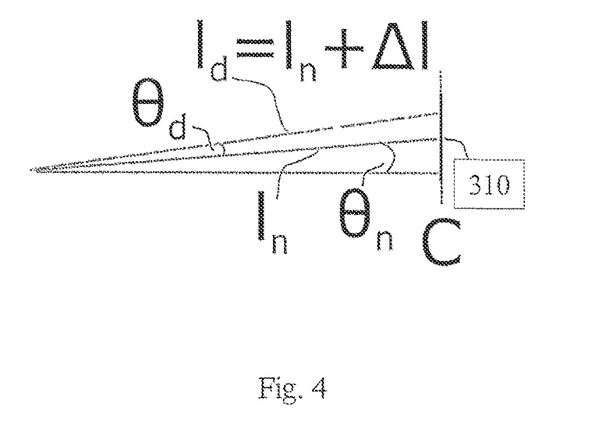
FIG. 4 shows a change in length caused by a drift of the optical device.

FIG: 4 shows a change in length by an angle $\theta_d$ (drift angle) caused by drift.

When drift in the orientation of the optical device or drift of the galvanometer system occurs during operation, the position of the OCT beam on the reference geometry changes for an angle $\theta_0$ by the drift angle $\theta_d$, as shown in FIG. 4. This change in angle results in a change in length $\Delta l = l_0 - l_d$ detectable by the OCT system. The measured change in length may then be used by a control to compensate for the drift of the galvanometer scanner, allowing the real position of the measuring spot on the workpiece to be determined more accurately than it would be possible without compensation. This makes a measurement by the coherence tomograph more accurate.

In some embodiments, the change in drift angle $\theta_d$ may be translated optically to produce a greater change in length $\Delta l$, thereby increasing the sensitivity of drift determination.

Typically, the evaluation unit is configured to determine a distance between the reference plane A and two or more points on the optical reference geometry. For example, when calibrating or setting up the system, further points of the reference geometry may be measured at different orientations of the optical device at angles $\theta_1, \theta_2 \ldots \theta_n$ to determine the associated lengths $l_1, l_2 \ldots l_n$. These points may be used to more precisely determine the orientation or drift. By measuring a plurality of points on the reference geometry, e.g. a precision of the determination of the orientation, and in particular the drift of the optical device 250, may be increased via an arithmetic operation. In addition, a plurality of points on the reference geometry may be measured to compensate for the drift in a plurality of dimensions. This is explained in more detail with reference to FIGS. 6 to 8.

Figure 5:
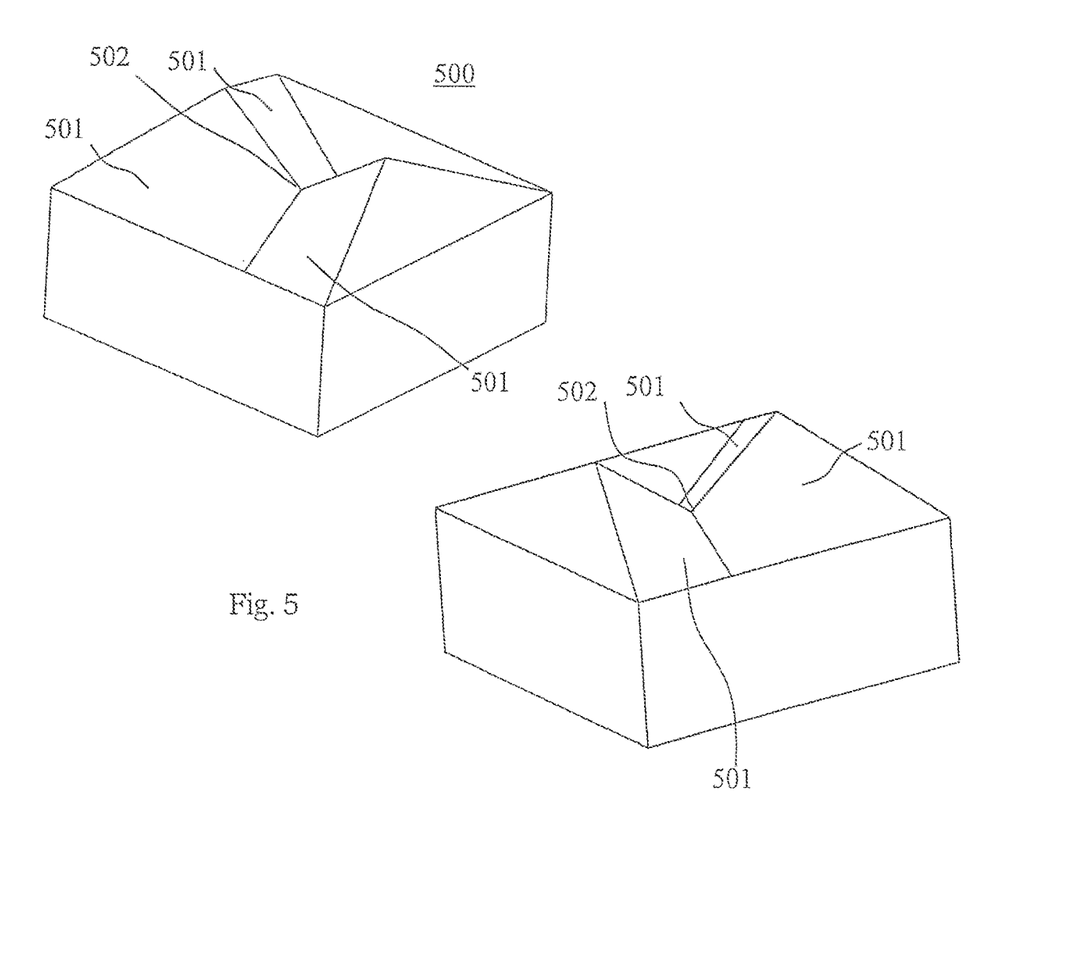
FIG. 5 shows perspective views of a reference geometry according to embodiments of the present disclosure.

FIG. 5 shows perspective views of a reference geometry 500 in accordance with embodiments of the present disclosure. The reference geometry 500 includes a plurality of second reference planes 501. Although five second reference planes 501 are shown by way of example, the present disclosure is not limited thereto, and any suitable number of second reference planes may be provided. For example, one, two, three, four, five or more second reference planes may be provided. Particularly preferred are four second reference planes intersecting at a common point.

Typically, the optical reference geometry 500 includes at least one planar diffusely reflective surface. The planar diffusely reflective surface allows ensuring that the back reflection doesn't become too large for the OCT sensor compared to the back reflection from the process observation, and thus the intensity of the source does not have to be reduced.

According to embodiments, the reference geometry is an optical element with a surface having discontinuities. In particular, the reference geometry may include a plurality of non-parallel planes. For example, the planes may be inclined surfaces meeting at a common point 502. The common point 502 may be the lowest point. The non-parallel planes may provide the second reference planes 501. For example, the optical reference geometry may include two or more second reference planes 501, wherein the two or more second reference planes are each planar diffusely reflective surfaces.

The reference geometry 500 may include a calibration plane, calibration position, or calibration point. The distance between the first reference plane and the calibration plane/point is referred to as $l_0$ and can be precisely determined for at least one angle $\theta_0$ by the OCT measurement technique when setting up the system. For example, the four second reference planes shown in FIG. 5 may be four inclined surfaces meeting at the common point 502, where the point 502 represents the calibration zero point (or calibration position).

In some embodiments, the reference geometry is shaped such that the type of change in length can be used to calculate in which dimension (e.g., in X or Y direction) the drift has occurred. For this purpose, as described above, four second reference planes 501 may be arranged such that the four second reference planes 501 intersect at the calibration zero point 502.

Figure 6:
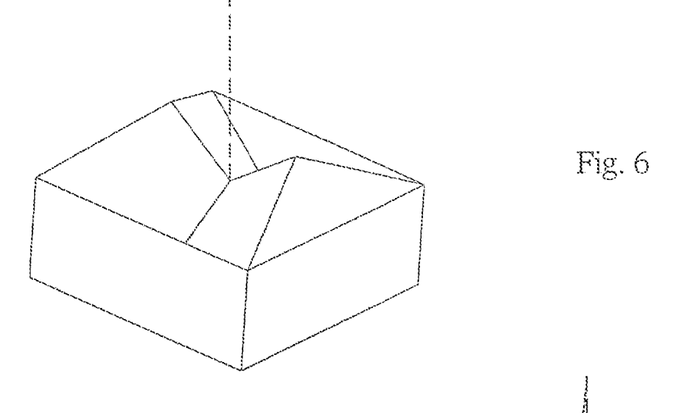
FIG. 6 shows a reference geometry without drift.
Figure 7:
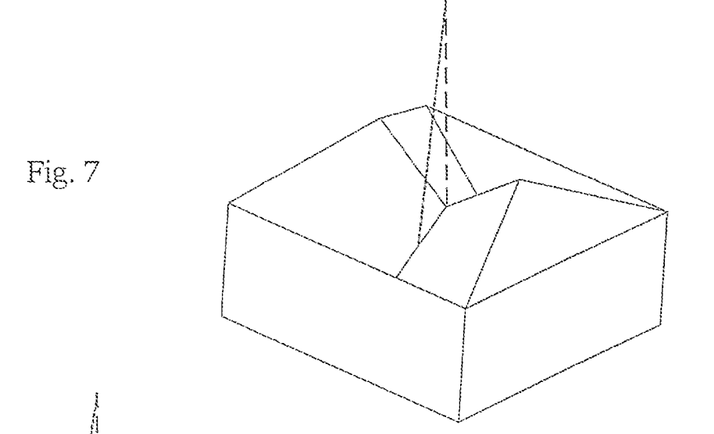
FIG. 7 shows a reference geometry and a drift in X direction.
Figure 8:
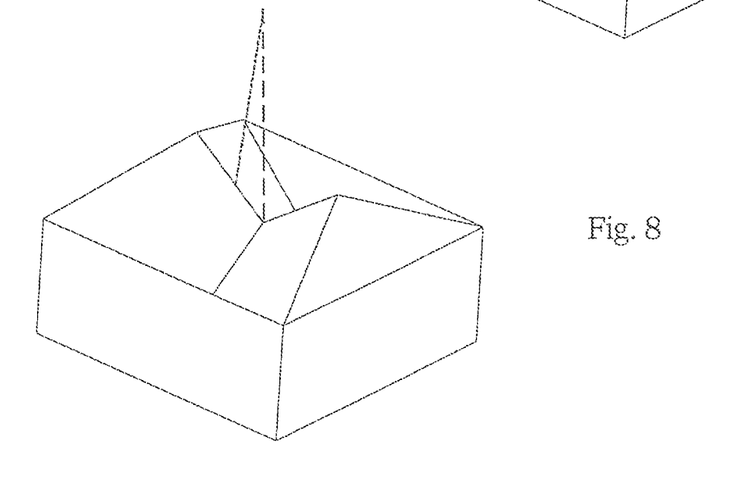
FIG. 8 shows a reference geometry and a drift in Y direction.

In particular, at least two of the second reference planes 501 may be arranged such that a deviation of the orientation of the optical device in a first dimension results in an increase in distance. At least two further second reference planes may be arranged such that a deviation of the orientation of the optical device in a second dimension results in a decrease in distance. This is explained in more detail with reference to FIGS: 6 to 8.

FIG. 6 shows the reference geometry without drift. The measuring beam hits the calibration position or the calibration point and the deviation between the actual position and the desired position of the optical device is equal to zero.

FIG. 7 shows a drift in the first dimension or direction, which may be an X direction. A deviation of the orientation of the optical device in the first dimension results in an increase in distance.

FIG. 8 shows a drift in the second dimension or direction, which may be a Y direction. The second dimension or Y direction may be perpendicular to the first dimension or X direction. A deviation of the orientation of the optical device in the second dimension results in a distance decrease.

Thus, the sign of the change in distance can be used to infer the direction in which the optical device drifts. For example, if the optical device has one mirror each for the X deflection and the Y deflection, it can be deduced which of the two mirrors is drifting.

Preferably, the optical coherence tomograph is configured to compensate for a deviation of the orientation of the optical device based on the determined distance in one or more spatial dimensions. For example, the angular position of the at least one mirror of a galvanometer scanner may be corrected by rotating about the axes in two spatial dimensions. If there is drift in the X direction, the corresponding mirror may be rotated about the X axis to compensate for the drift. If there is drift in the Y direction, the corresponding mirror may be rotated about the Y axis to compensate for the drift.

The invention claimed is:

1. A coherence tomograph, comprising:
   an optical device for displacing an optical measuring beam of said coherence tomograph, the optical device being configured to move said optical measuring beam across a surface of a workpiece; and
   a device for determining an orientation of said optical device of said coherence tomograph, comprising:
   an optical reference geometry having at least one second reference plane;
   a deflection optics configured to direct said optical measuring beam of said coherence tomograph displaced by said optical device onto said optical reference geometry; and
   an evaluation unit configured to determine a distance between a first reference plane and said at least one second reference plane of said optical reference geometry in order to determine the orientation of said optical device.

2. The coherence tomograph according to claim 1, wherein said deflection optics comprises at least one of one or more mirrors, one or more galvanoscanners, one or more prisms, and one or more optical gratings.

3. The coherence tomograph according to claim 1, wherein said deflection optics comprises a partially transmissive mirror configured to deflect a portion of said optical measuring beam to said optical reference geometry and transmit another part of said optical measuring beam.

4. The coherence tomograph according to claim 1, wherein said deflection optics comprises a lens configured to direct said optical measuring beam onto said at least one second reference plane of said optical reference geometry.

5. The coherence tomograph according to claim 1, wherein said evaluation unit is configured to determine a distance between said first reference plane and one or more points on said optical reference geometry.

6. The coherence tomograph according to claim 1, wherein said at least one second reference plane of said optical reference geometry has a planar diffusely reflective surface.

7. The coherence tomograph according to claim 1, wherein said at least one second reference plane of said optical reference geometry includes four second reference planes which are inclined with respect to each other and intersect at a common calibration zero point.

8. The coherence tomograph according to claim 1, wherein at least two of said at least one second reference planes are arranged such that a deviation of the orientation of said optical device in a first direction results in an increase in distance, and wherein at least two further second reference planes are arranged such that a deviation of the orientation of said optical device in a second direction results in a decrease in distance.

9. The coherence tomograph according to claim 1, wherein said optical device is manually or automatically movable.

10. The coherence tomograph according to claim 1, wherein said coherence tomograph is configured to compensate for a deviation of the orientation of said optical device based on the determined distance in one or more spatial dimensions.

11. The coherence tomograph according to claim 1, wherein said coherence tomograph comprises a measuring arm and a reference arm and said optical device is disposed in said reference arm.

12. A laser machining system, comprising:
   a laser device for providing a machining beam, said laser device being configured to direct said machining beam onto a machining area of a workpiece; and
   the coherence tomograph according to claim 1.

* * * * *